(12) United States Patent
Lo et al.

(10) Patent No.: US 8,056,807 B2
(45) Date of Patent: Nov. 15, 2011

(54) LIGHT PROJECTING APPARATUS OF SCANNER MODULE

(75) Inventors: Hsin-Pao Lo, Taipei (TW); San-Tang Chen, Taipei (TW)

(73) Assignee: Teco Image System Co., Ltd, Taipei (TW)

( * ) Notice: Subject to any disclaimer, the term of this patent is extended or adjusted under 35 U.S.C. 154(b) by 463 days.

(21) Appl. No.: 12/355,007

(22) Filed: Jan. 16, 2009

(65) Prior Publication Data
US 2010/0123008 A1 May 20, 2010

(30) Foreign Application Priority Data
Nov. 18, 2008 (TW) .............................. 97144594 A (51) Int. Cl.
*F21V 7/04* (2006.01)
(52) U.S. Cl. ........................................ 235/454; 362/617
(58) Field of Classification Search .................. 235/454, 235/462.42; 362/617
See application file for complete search history.

(56) References Cited

U.S. PATENT DOCUMENTS

| | | | | |
|---|---|---|---|---|
| 6,414,801 B1 * | 7/2002 | Roller | | 359/726 |
| 7,159,986 B2 * | 1/2007 | Bremer et al. | | 353/28 |
| 7,445,370 B2 * | 11/2008 | Ohkawa | | 362/617 |
| 7,557,781 B2 * | 7/2009 | Chuang et al. | | 345/82 |
| 2001/0019378 A1 * | 9/2001 | Yamaguchi | | 349/61 |
| 2006/0124835 A1 * | 6/2006 | Kiyomoto et al. | | 250/216 |
| 2008/0156881 A1 * | 7/2008 | Vinogradov | | 235/462.42 |
| 2009/0109667 A1 * | 4/2009 | Cheng et al. | | 362/227 |
| 2010/0141167 A1 * | 6/2010 | Kato | | 315/287 |

* cited by examiner

*Primary Examiner* — Daniel Hess
(74) *Attorney, Agent, or Firm* — Rabin & Berdo, P.C.

(57) ABSTRACT

A light projecting apparatus of a scanner module, including: a substrate, a plurality of light emitting diodes (LEDs), positioned on the substrate and adapted to generate a plurality of incident beams; a diffusion plate, corresponding to the plurality of LEDs, adapted to receive the plurality of incident beams and diffuse the plurality of incident beams uniformly over a scanned object and including: a first plane, receiving the plurality of incident beams; two end faces; connected to the two ends of the first plane in a transverse direction; and a second plane, the two ends thereof being respectively connected to the two end faces, adapted to diffuse the plurality of incident beams uniformly over the scanned object and including: a plurality of second transverse concave portions, adapted to diffuse the plurality of incident beams; and a plurality of second transverse convex portions, adapted to gather the plurality of incident beams, where the plurality of second transverse convex portions and the plurality of second transverse concave portions are interlaced in a transverse direction, allowing the plurality of incident beams to be diffused uniformly over the scanned object.

5 Claims, 7 Drawing Sheets

LIGHT PROJECTING APPARATUS OF SCANNER MODULE

CROSS-REFERENCES TO RELATED APPLICATIONS

This non-provisional application claims priority under 35 U.S.C. §119(a) on Patent Application No(s). 97144594 filed in Taiwan, R.O.C. on Nov. 18, 2008, the entire contents of which are hereby incorporated by reference.

FIELD OF THE INVENTION

The present invention relates to a light projecting apparatus, and more particularly to a light projecting apparatus of a scanner module.

BACKGROUND

Accompanying the progress of technology, optical scanners have already become a popular computer peripheral device. An image capturing method for an optical scanner mainly uses a light emitting device to project light onto a document. The light is guided to a light sensing element through a lens set after being reflected by the document, and the light sensing element can check and measure light with different strength reflected from different areas on the document. The reflected light wave is then converted to digital data. Thereafter, scanning software is used to read the data and reassemble it into a computer image file.

Figure 1:
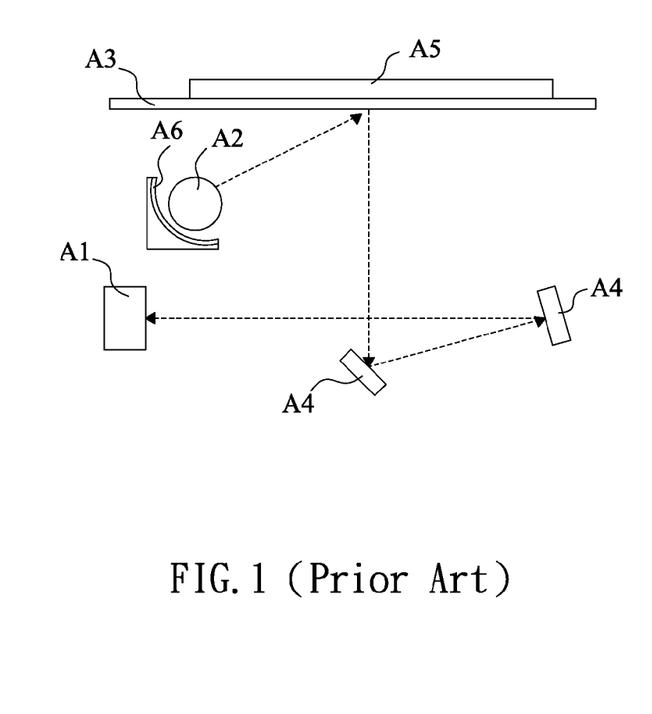
FIG. 1 is a schematic view of a conventional scanner module structure.
Figure 2:
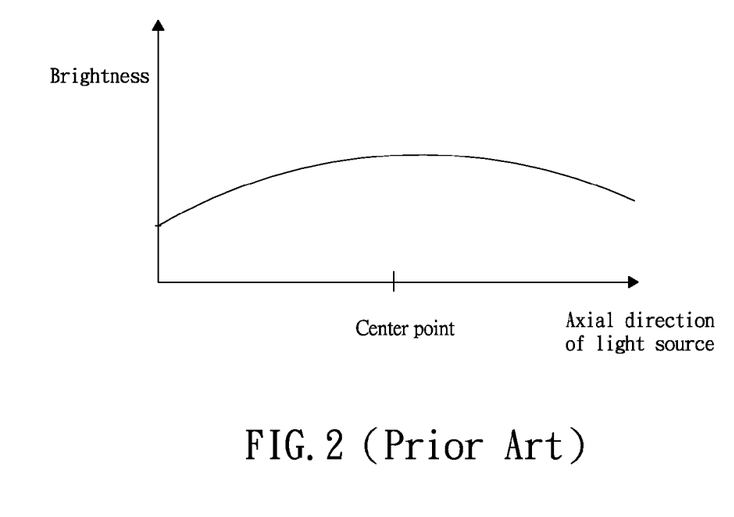
FIG. 2 is a graph of a brightness curve of a conventional scanner.

Please refer to FIGS. 1 and 2. An ideal light emitting device should have a uniform brightness distribution, but the current scanner modules mostly use a charge coupled device (CCD) as a light sensing element A1 and a fluorescent tube A2 as a light emitting device, so as to utilize the fluorescent tube A2 to illuminate and scan a document A5 placed on a platform A3, and reflect light emitted from the fluorescent tube A2 to the document A5 through a light reflecting sheet A6. The result is that the light sensing element receives light unevenly, causing the light received to be brighter at a middle part and dimmer at the parts of two sides, influencing the scanning quality after reflectors A4 reflect light to CCD A1, because the brilliance of the fluorescent tube A2 at the middle part thereof is much higher than the brilliance at the two ends thereof, or it is limited by a characteristic of an optical lens.

Due to the increase in environmental awareness, a fluorescent tube such as external electrode fluorescent (EEFL) or cold cathode fluorescent (CCFL) used in the scanner module is gradually being replaced by other light sources, because it contains mercury or other harmful substances; a light emitting diode (LED) is currently one of the best substitutes. Accompanying the popularity of LEDs, an LED light strip structure replacing the fluorescent tube has become common; it is formed as a light source device similar to a fluorescent tube by connecting LED pellets to one another in series in an equidistant arrangement on a long-strip type substrate. However, the illumination strength of the entire body has the same characteristic problem as the fluorescent tube, namely that there is a significant drop between the brightness of a middle part thereof and the brightness of the two ends thereof. To solve this problem, the brightness of the two ends can always be increased by means of firmware (F/W) compensation at the end of the process to allow the brightness to be as uniform as possible, improving image brightness. However, the method mentioned above is unable to improve a signal/noise ratio (S/N ratio); noise is also amplified after the brightness of the two ends is increased by means of the firmware (F/W), causing an image to be distorted.

The scanner module can also use a fog-like diffusion plate to diffuse the light uniformly besides using the aforementioned firmware (F/W) compensation to achieve uniform brightness, but light intensity will be decreased greatly, resulting in low image brightness.

SUMMARY OF THE INVENTION

To improve a light projection structure of a scanner module, ensuring light sensing elements receive light uniformly, the present invention is proposed. The present invention proposes a light projecting apparatus of a scanner module, including:
a substrate,
a plurality of light emitting diodes (LEDs), positioned on the substrate and adapted to generate a plurality of incident beams;
a diffusion plate, corresponding to the plurality of LEDs, adapted to receive the plurality of incident beams and diffuse the plurality of incident beams to a scanned object uniformly and including:
   a first plane, receiving the plurality of incident beams;
   two end faces; connected to the two ends of the first plane in a transverse direction; and
   a second plane, the two ends thereof being respectively connected to the two end faces, adapted to diffuse the plurality of incident beams to the scanned object uniformly and including:
   a plurality of second transverse concave portions, adapted to diffuse the plurality of incident beams; and
   a plurality of transverse convex portions, adapted to gather the plurality of incident beams, where the plurality of second transverse convex portions and the plurality of second transverse concave portions are interlaced in a transverse direction, allowing the plurality of incident beams to be diffused uniformly over the scanned object.

The present invention also proposes a light projecting apparatus of a scanner module, including:
a base, including a reflecting condensing face;
a substrate, positioned on one side of the reflecting condensing face
a plurality of light emitting diodes (LEDs), positioned on the substrate and adapted to generate a plurality of incident beams;
a diffusion plate, corresponding to the plurality of LEDs, adapted to receive the plurality of incident beams and diffuse the plurality of incident beams over the reflecting condensing face uniformly and including:
   a first plane, receiving the plurality of incident beams;
   two end faces; connected to the two ends of the first plane in a transverse direction; and
   a second plane, the two ends thereof being respectively connected to the two end faces, adapted to diffuse the plurality of incident beams over the reflecting condensing face and including:
   a plurality of second transverse concave portions, adapted to diffuse the plurality of incident beams; and
   a plurality of transverse convex portions, adapted to gather the plurality of incident beams, where the plurality of second transverse convex portions and the plurality of second transverse concave portions are interlaced in a transverse direction, allowing the plurality of incident beams to be diffused uniformly over the reflecting condensing face and reflected to a scanned object through the reflecting condensing face.

The present invention also proposes a light projecting apparatus of a scanner module, including:

a base, including a reflecting condensing face;

a substrate, positioned on one side of the reflecting condensing face; and a plurality of light emitting diodes (LEDs), positioned on the substrate, adapted to generate a plurality of incident beams and projecting the plurality of incident beams to the reflecting condensing face, the plurality of incident beams being reflected to a scanned object through the reflecting condensing face.

Accordingly, the plurality of second transverse convex portions and the plurality of second transverse concave portions are projected from the first plane in a longitudinal direction. In these cases the longitudinal direction is substantially perpendicular to the transverse direction.

Furthermore, the plurality of light emitting diodes are arranged on the substrate in a transverse direction. In addition, the plurality of LEDs correspond to the plurality of second transverse concave portions and emit light directly toward the plurality of second transverse concave portions.

In addition, the first plane may include a plurality of first transverse concave portions and a plurality of first transverse convex portions interlaced with the plurality of first transverse concave portions in a transverse direction.

The present invention configures the diffusion plate with the plurality of second transverse convex portions and the plurality of second transverse concave portions above the plurality of LEDs, thereby enabling the scanned object to receive uniform light by gathering light through the second transverse convex portions and diffusing light through the second transverse concave portions. Image distortion caused from firmware (F/W) at the end of the process can be decreased substantially after the brightness of images processed by an imaging system has become more uniform (i.e. the S/N signal ratio of the two ends is increased), and image scanning quality can further be increased. In addition, the second transverse convex portions and the second transverse concave portions of the present invention are a convex lens type from a lateral view such that they have a light gathering effect, capable of increasing the brightness of the light projected to the scanned object greatly and overcoming the light intensity reduction caused by the conventional fog-like diffusion plate.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 3:
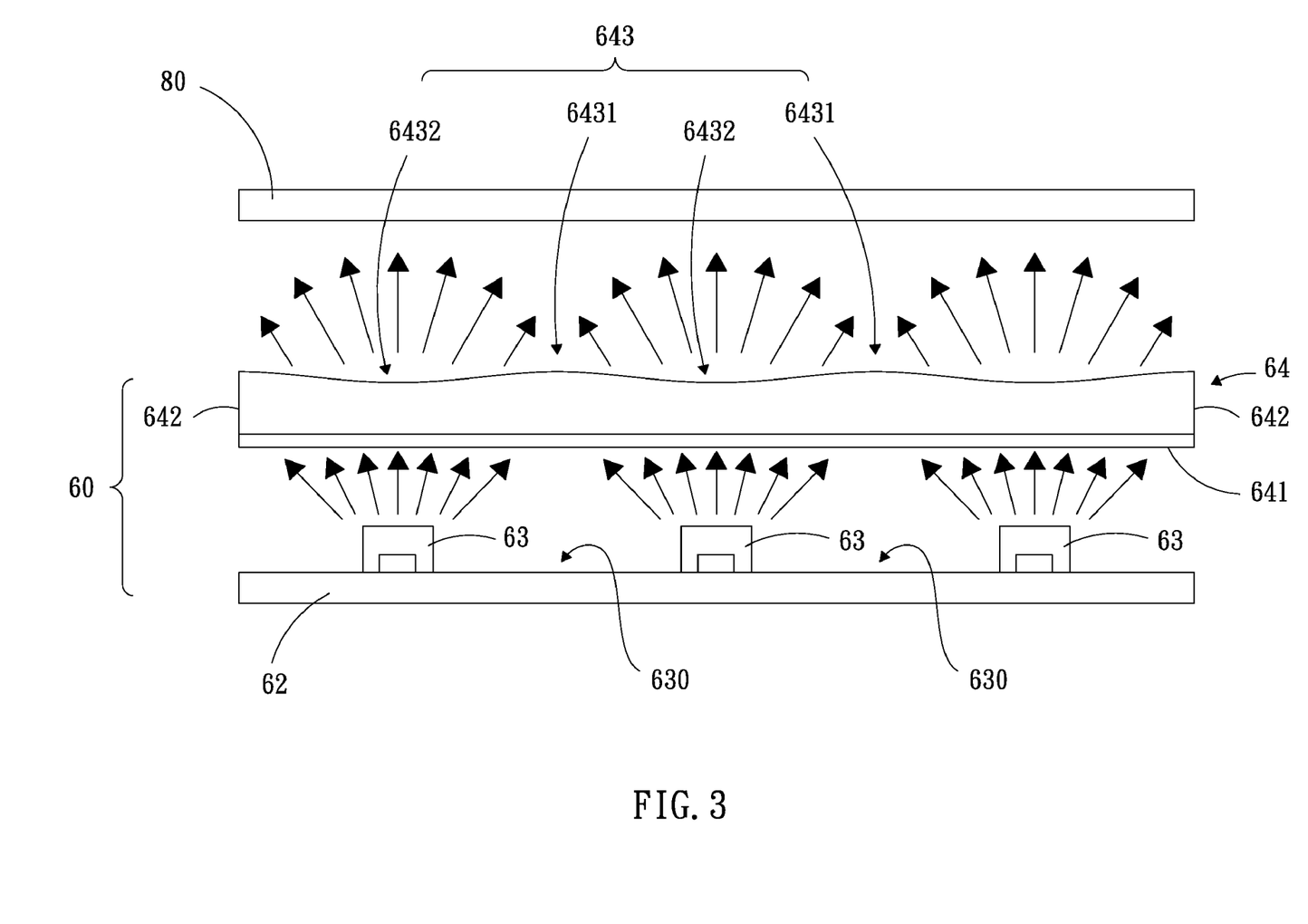
FIG. 3 is a frontal schematic view, showing a light projecting apparatus of a embodiment according to the present invention.
Figure 4:
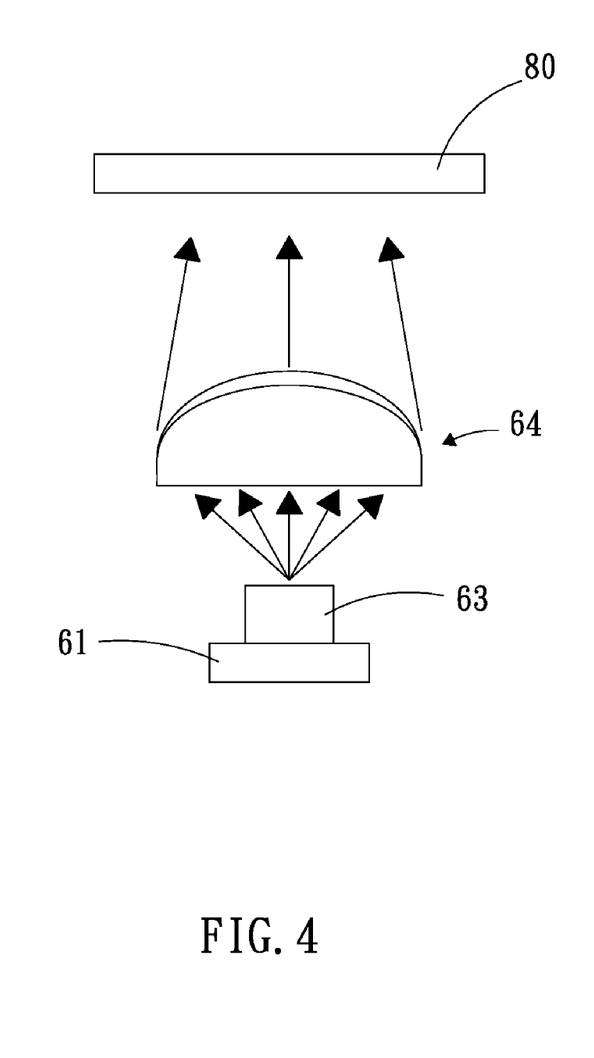
FIG. 4 is a lateral schematic view, showing a light projecting apparatus of the first embodiment according to the present invention.
Figures 5A, 5B:
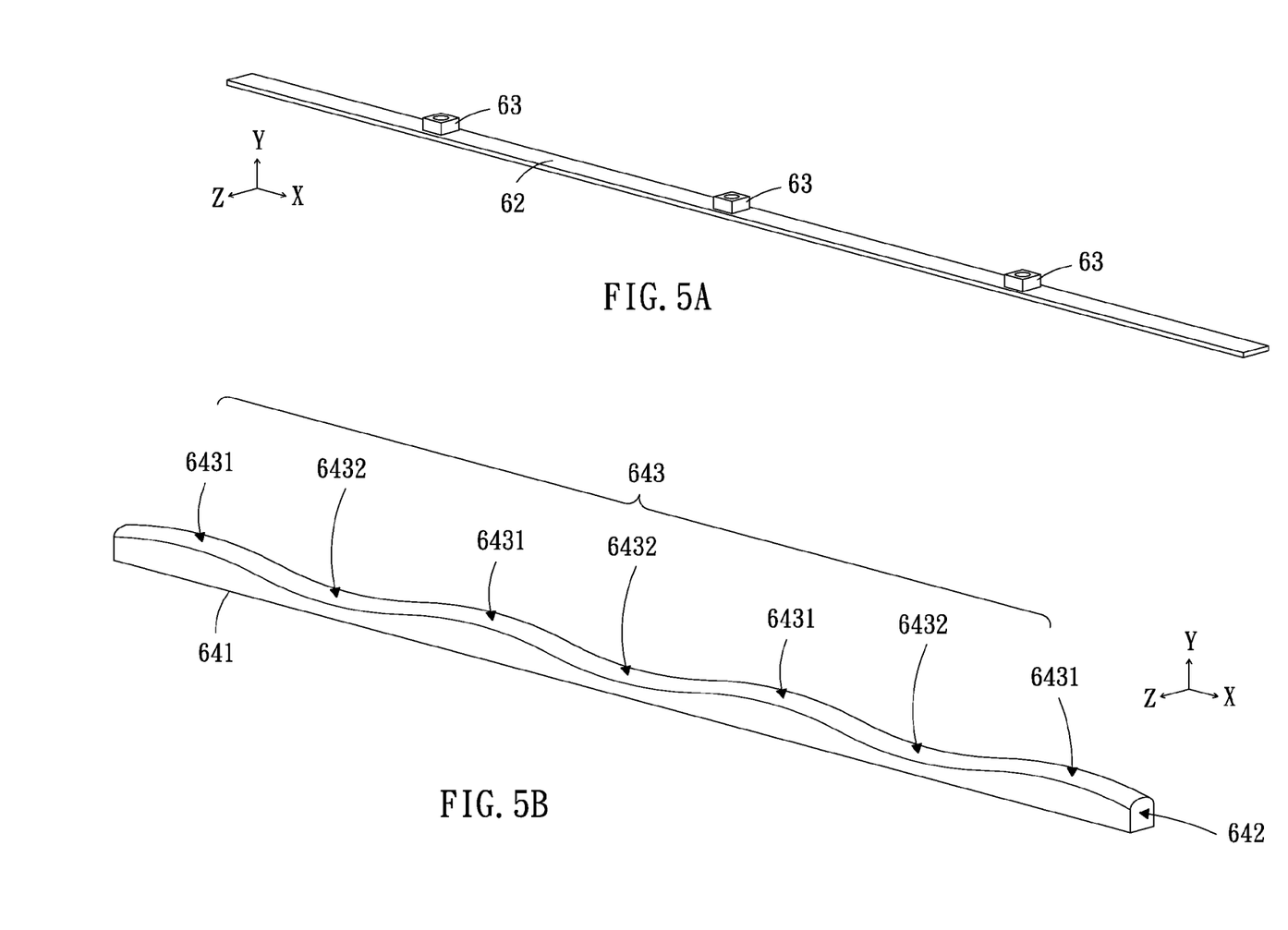
FIG. 5A is a schematic view, showing a substrate and a plurality of light emitting diodes of the first embodiment according to the present invention.
FIG. 5B is a schematic view, showing a diffusion plate of the first embodiment according to the present invention.

Please refer to FIGS. 3, 4, 5A and 5B. FIG. 3 is a frontal schematic view, showing a light projecting apparatus of an embodiment according to the present invention. FIG. 4 is a lateral schematic view, showing a light projecting apparatus of the first embodiment according to the present invention. FIG. 5A is a schematic view, showing a substrate and a plurality of light emitting diodes of the first embodiment according to the present invention. FIG. 5B is a schematic view, showing a diffusion plate of the first embodiment according to the present invention.

A light projecting apparatus 60 of a scanner module includes a substrate 62, a plurality of light emitting diodes (LEDs) 63 and a diffusion plate 64.

The substrate 62 approximates a long strip type. The two ends and the middle section of the substrate 62 may preferably be positioned at the same horizontal plane, but it is not limited to this; the two ends and the middle section of the substrate 62 may also be at different horizontal planes to constitute a curved plate.

The plurality of LEDs 63 are arranged on the substrate 62 in a transverse direction (X axis) as FIG. 5A shows, and are used to generate a plurality of incident beams. In this case the plurality of LEDs 63 may preferably be arranged on the substrate 62 equidistantly, i.e. an arrangement spacing interval 630 between the two adjacent LEDs 63 is equal, but it is not limited to this; the arrangement spacing intervals 630 of the plurality of LEDs 63 may also be decreased gradually from the middle section of the substrate 62 toward the two ends of the substrate 62. Furthermore, the brightness of the plurality of LEDs 63 may be the same, but it may be different depending on practical necessity. In this case the brightness of the plurality of LEDs 63 on the middle section of the substrate 62 is smaller than the brightness of the plurality of LEDs 63 on the two sides of the substrate 62, and the brightness of the plurality of LEDs 63 may be decreased gradually from the middle section of the substrate 62 toward the two ends of the substrate 62. In addition, the LED 63 may preferably be a white LED, and the plurality of LEDs 63 may be LEDs with a different level of brightness, but it is not limited to these according to the present invention.

The diffusion plate 64 approximates a long strip type, is positioned at one side of the substrate 62 and corresponds to the plurality of LEDs 63; it may be made from a transparent material, but it is not limited to this according to the present invention; it may also be made from a translucent material. One side of the diffusion plate 64 close to the plurality of LEDs 63 is disposed with a first plane 641 adapted to receive a plurality of incident beams, another side thereof is disposed with a corresponding second plane 643 and the two ends thereof are respectively connected to the first plane 641 and the second plane 643 in a transverse direction by means of a end face 642. In addition, the second plane 643 is disposed with a plurality of second transverse convex portions 6431 and a plurality of second transverse concave portions 6432 interlaced in the transverse direction as FIG. 5B shows, where the plurality of second transverse convex portions 6431 are used to gather the plurality of incident beams in the transverse direction, and the plurality of second transverse concave portions 6432 are used to diffuse the plurality of incident beams in the transverse direction.

As mentioned above, the plurality of second transverse convex portions 6431 and the plurality of second transverse concave portions 6432 are projected from the first plane 641 (or may be projected from the substrate 62) in a longitudinal direction, and the height of the second transverse convex portion 6431 projected from the first plane 641 is larger than the height of the second transverse concave portion 6432 projected from the first plane 641 as FIG. 4 shows, allowing the plurality of second transverse convex portions 6431 and the plurality of second transverse concave portions 6432 to gather the plurality of incident beams generated from the plurality of LEDs 63 in the longitudinal direction. In this case the longitudinal direction is substantially perpendicular to the transverse direction.

In the present embodiment, the plurality of LEDs 63 may be disposed correspondingly to the sides of the second transverse concave portions 6432 and aligned to the plurality of second transverse concave portions 6432. The arrangement spacing intervals 630 between two adjacent LEDs 63 are aligned to the plurality of second transverse convex portions 6431, allowing the plurality of LEDs 63 to project the incident light directly toward the plurality of second transverse concave portions 6432. Because the LED 63 is a point light source, the intensity of the directly projected incident light is strongest such that the second transverse concave portion 6432 is used to diffuse the incident light in the transverse direction, and the intensity of the laterally projected incident light is weaker such that the second transverse convex portions 6431 is used to gather the incident light in the transverse direction as FIG. 3 shows, ensuring the plurality of incident beams is projected uniformly on a scanned object 80, resulting in the scanned object 80 receiving uniform light, thereby resulting in the image scanning brightness being genuinely uniform.

Figure 6:
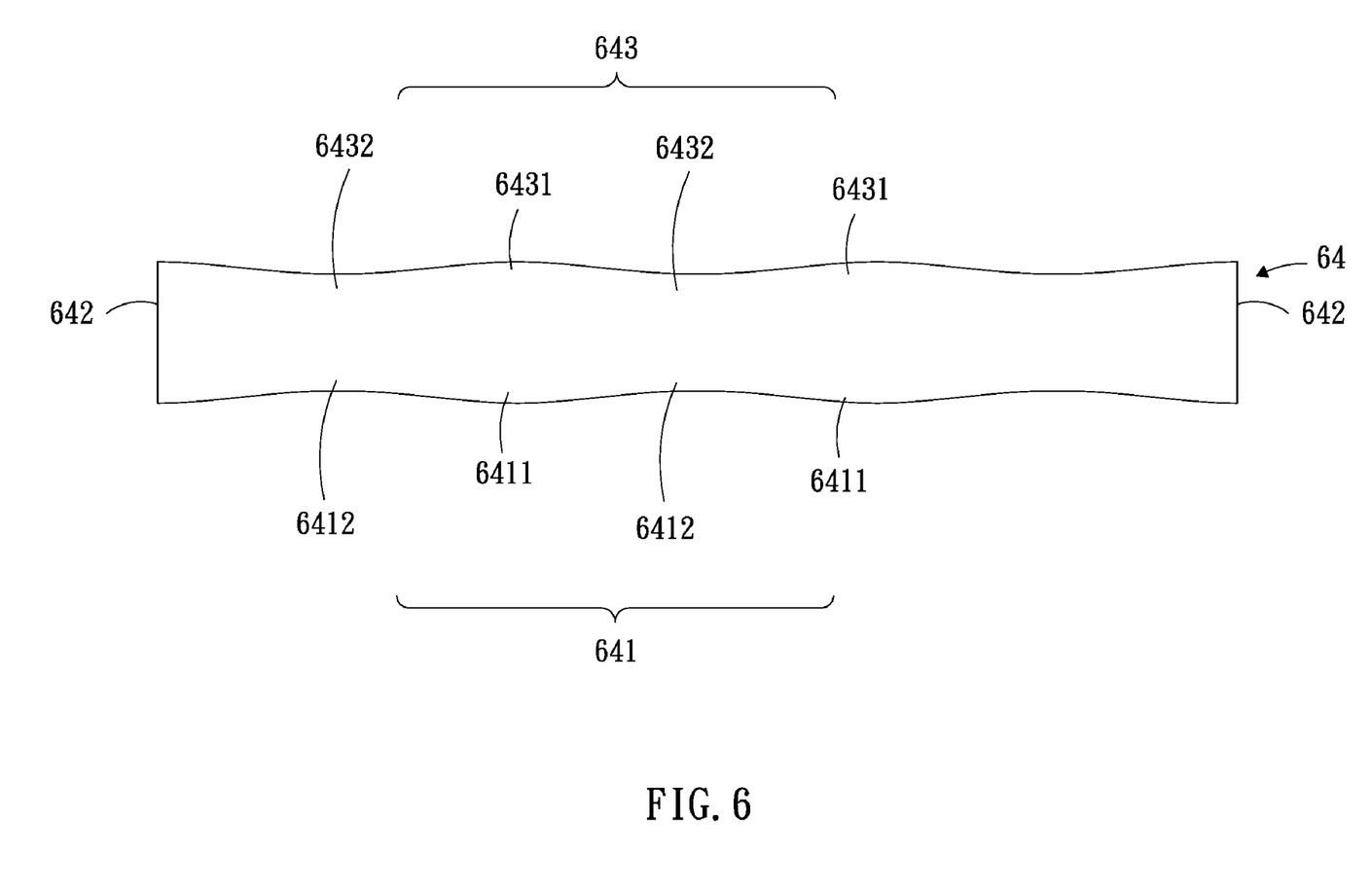
FIG. 6 is a lateral schematic view, showing a light projection apparatus of a second embodiment according to the present invention.

Please refer to FIG. 6. FIG. 6 is a lateral schematic view, showing a light projection apparatus of a second embodiment according to the present invention.

The difference between the present embodiment and the first embodiment is that a plurality of first transverse convex portions 6411 and a plurality of first transverse concave portions 6412 may also be interlaced in the transverse direction on the first plane 641 besides the plurality of second transverse convex portions 6431 and the plurality of second transverse concave portions 6432 are interlaced in the transverse direction on the second plane 643, where the plurality of first transverse convex portions 6411 may correspond to the plurality of second transverse convex portions 6431 and the plurality of first transverse concave portions 6412 may correspond to the plurality of second transverse concave portions 6432, thereby ensuring that the plurality of incident beams may be projected more uniformly on the scanned object 80.

Figure 7:
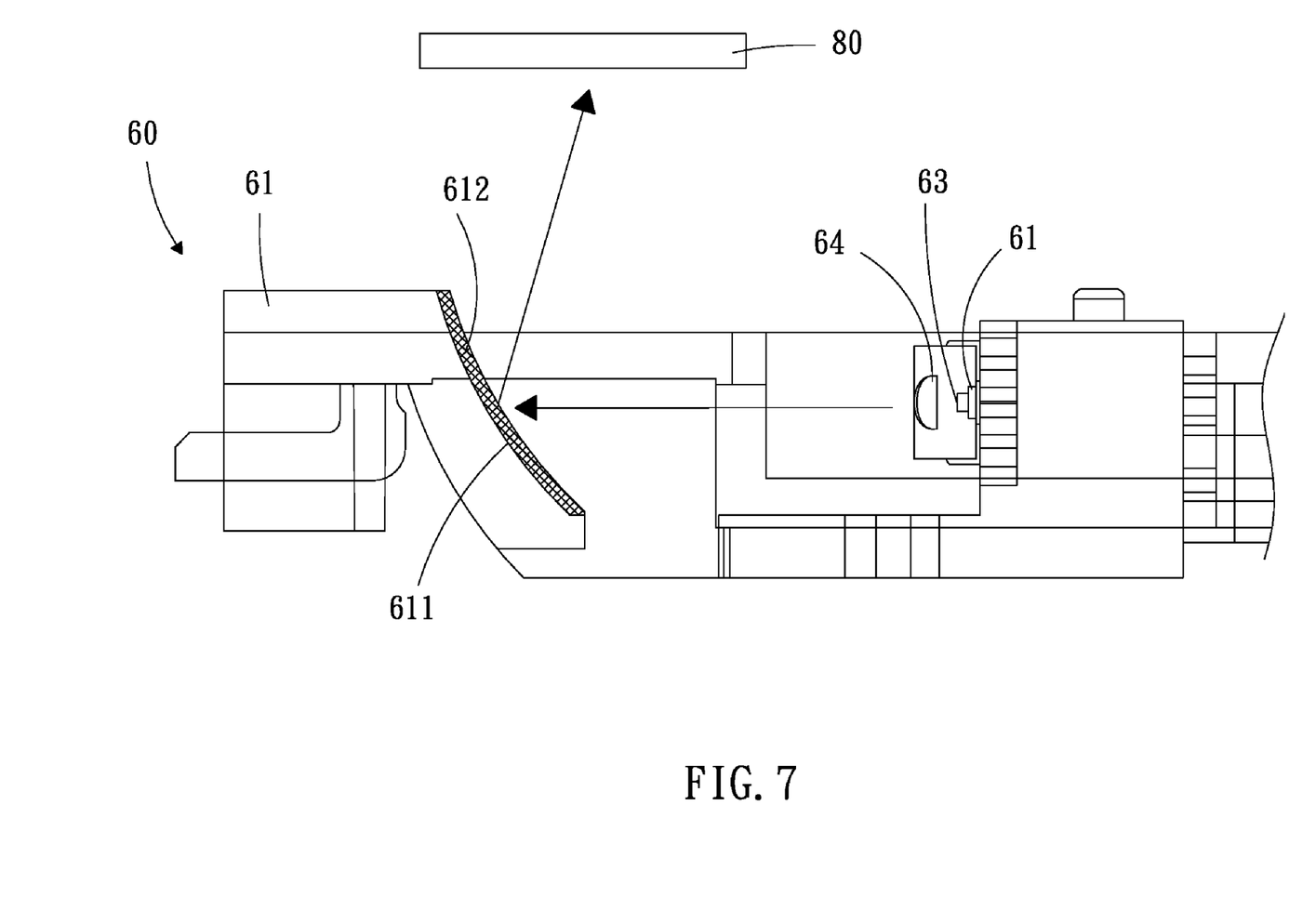
FIG. 7 is a lateral schematic view, showing a light projection apparatus of a third embodiment according to the present invention.

Please refer to FIG. 7. FIG. 7 is a lateral schematic view, showing a light projection apparatus of a third embodiment according to the present invention.

The light projecting apparatus 60 of a scanner module according to the present invention may further includes a base 61, one side thereof may be disposed with a curved reflecting condensing face 611, another side thereof may be disposed with the substrate 62 and the plurality of LEDs 63 and the diffusion plate 64 is disposed between the substrate 62 and the reflecting condensing face 611. In addition, the reflecting condensing face 611 may be attached with a reflecting sheet 612, and the reflecting sheet 612 may be a pure white adhesive sheet or completely reflective adhesive sheet depending on practical necessity, where the pure white adhesive sheet may increase diffusion and the completely reflective adhesive sheet may decrease light loss, but it is not limited to these according to the present invention.

The plurality of incident beams generated from the plurality of LEDs 63 can be gathered through the plurality of second transverse convex portions 6431 and the plurality of second transverse concave portions 6432 in the longitudinal direction, and the second transverse concave portions 6432 (positioned above the LEDs 63), is used to diffuse the incident light and the second transverse convex portions 6431 to gather the incident light in the transverse direction, allowing the plurality of incident beams to be projected on the reflecting condensing face 611 uniformly and reflected over the scanned object 80 through the reflecting sheet 612 on the reflecting condensing face 611, resulting in the scanned object 80 receiving uniform light.

Figure 8:
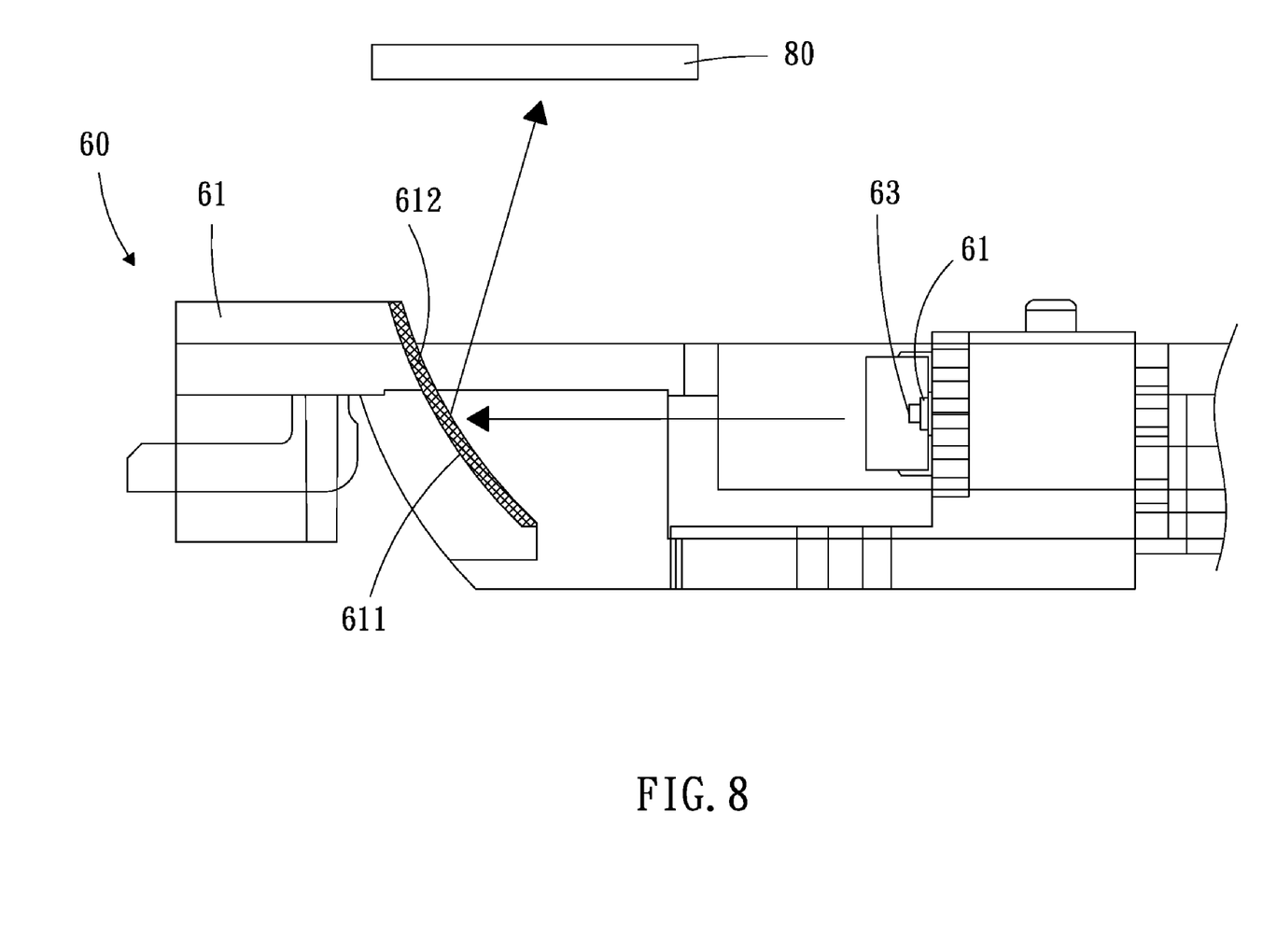
FIG. 8 is a lateral schematic view, showing a light projection apparatus of a fourth embodiment according to the present invention.

Please refer to FIG. 8. FIG. 8 is a lateral schematic view, showing a light projection apparatus of a fourth embodiment according to the present invention.

The difference between the present embodiment and the third embodiment is that one side of the base 61 may be disposed with the curved reflecting condensing face 611, another side thereof may be disposed with the substrate 62 and the plurality of LEDs 63, but the diffusion plate 64 is not disposed between the substrate 62 and the reflecting condensing face 611 in the present embodiment. In addition, the reflecting condensing face 611 may be attached with a reflecting sheet 612. The plurality of incident beams generated from the plurality of LEDs 63 are reflected over the scanned object 80 by the reflecting sheet 612 on the reflecting condensing face 611 after they are projected to the reflecting sheet 612 on the reflecting condensing face 611. In this case, the arrangement space interval 630 between the two LEDs 63 may be decreased gradually from the middle section of the substrate 62 toward the two ends of the substrate 62, or the LEDs 63 with different brightness may be adopted. For example, the plurality of LEDs 63 on the middle section of the substrate 62 is brighter than the plurality of LEDs 63 on the middle section of the substrate 62, and the brightness of the plurality of LEDs 63 may be decreased gradually from the middle section of the substrate 62 toward the two sides of the substrate 62, thereby resulting in the scanned object 80 receiving uniform light.

In the second and third embodiments, the substrate 62 is disposed on the side of the reflecting face 611 of the base 61 and the diffusion plate 64 may be added between the substrate 62 and the reflecting condensing face 611; the incident light is reflected by the reflecting condensing face 611 after the incident light is projected to the reflecting condensing face 611, thereby decreasing the space occupied by the substrate 62, the plurality of LEDs 63, and the diffusion plate 64, so as to reduce effectively the size of the scanner module in a perpendicular direction.

The present invention uses the diffusion plate to receive the incident light generated from the plurality of LEDs and diffuse it over the scanned object, or reflect it again over the scanned object through the reflecting condensing face after diffusing it to the reflecting condensing face, where the diffusing plate is disposed with the plurality of second transverse convex portions and the plurality of second transverse concave portions; the incident light is gathered by the plurality of second transverse convex portions and the plurality of second transverse concave portions in the longitudinal direction, and the incident light is diffused by the second transverse concave portions (positioned above the LEDs) and the incident light is gathered by the second transverse convex portions in the transverse direction, thereby resulting in the scanned object receiving uniform light. Image distortion caused from the firmware (F/W) at the end of the process can then be decreased substantially and image scanning quality can further be increased after the brightness of an image processed by an imaging system has been made more uniform (i.e. the S/N ratio is increased at the two ends). In addition, the second transverse convex portion and the second transverse concave portion of the present invention are a convex lens shape having a light gathering effect from a lateral view, capable of increasing substantially the brightness of the light projected on the scanned object and solving the problem of light intensity decreasing as a result of a conventional diffusing plate with a fog-like plane.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light projecting apparatus of a scanner module, comprising:
   a base, comprising a reflecting condensing face;
   a substrate, positioned on one side of the reflecting condensing face;
   a plurality of light emitting diodes (LEDs), positioned on the substrate, adapted to generate a plurality of incident beams, project the plurality of incident beams to the reflecting condensing face, and reflect the plurality of incident beams over a scanned object through the reflecting condensing face; and
   a diffusion plate corresponding to the plurality of LEDs and adapted to receive the plurality of incident beams and diffuse the plurality of incident beams over the reflecting condensing face, the diffusion plate comprising:
      a plurality of second transverse concave portions, adapted to diffuse the plurality of incident beams; and
      a plurality of second transverse convex portions, adapted to gather the plurality of incident beams, the plurality of second transverse convex portions and the plurality of second transverse concave portions being interlaced in a transverse direction, allowing the plurality of incident beams to be diffused uniformly over the reflecting condensing face.

2. The light projecting apparatus of a scanner module according to claim 1, wherein the plurality of second transverse convex portions and the plurality of second transverse concave portions are projected from a first plane in a longitudinal direction, and the longitudinal direction is substantially perpendicular to the transverse direction.

3. The light projecting apparatus of a scanner module according to claim 2, wherein the LEDs correspond to the plurality of second transverse concave portions and project the plurality of incident beams directly toward the plurality of the second transverse concave portions.

4. The light projecting apparatus of a scanner module according to claim 1, wherein the base further comprises a reflecting sheet attached to the reflecting condensing face.

5. The light projecting apparatus of a scanner module according to claim 1, wherein the plurality of LEDs are arranged on the substrate in the transverse direction.

* * * * *